April 3, 1962     D. J. HARVEY     3,027,725
REFRIGERATING APPARATUS
Filed Feb. 12, 1960

INVENTOR.
Douglas J. Harvey
BY
His Attorney

United States Patent Office 3,027,725
Patented Apr. 3, 1962

3,027,725
REFRIGERATING APPARATUS
Douglas J. Harvey, Utica, Mich., assignor to General Motors Corporation, Detroit, Mich., a corporation of Delaware
Filed Feb. 12, 1960, Ser. No. 8,450
5 Claims. (Cl. 62—3)

This invention is related in the general way to refrigerating apparatus of the thermoelectric type but more particularly it is directed toward a means for maintaining a constant reference temperature.

In making accurate temperature measurements with thermocouples, a reference temperature is required. The usual practice is to use a mixture of water and ice in a Dewar flask. As long as the bath has ice and water next to the reference junction, the temperature will remain constant. However, due to the fact that ice floats on water and that the density of water is a maximum at 4° C., stratification frequently occurs. This temperature stratification can cause a large error.

It is an object of this invention to provide a simple inexpensive device which will accurately maintain a medium at a constant reference temperature without attention.

It is another object of this invention to provide an accurate apparatus employing the expansion of a congealable liquid upon freezing to maintain its temperature constant.

These and other objects are attained in the form shown in the drawings in which a thermoelectric cell is associated with a congealable liquid whose temperature is to be maintained constant. The liquid is embodied in a copper container provided with a metal bellows. A direct current supply is connected through a switch operated by the bellows to the thermoelectric device. When the thermoelectric device has cooled the medium sufficiently to cause freezing, the bellows will expand to open the switch and the current will be cut off until the expansion of the liquid is reduced. This will cause cycling of the switch with the medium partly frozen so that a constant reference temperature is maintained. The thermocouples have their reference leads extending into the liquid medium.

If the device is to operate at ambient temperatures both above and below the freezing point of the medium, an additional reversing switch is connected between the power source and the thermoelectric cell. This reversing switch is arranged to be operated upon an expansion greater than the opening point of the previously mentioned switch. This reversing switch then will cause the thermoelectric cell to apply heat to the medium to cause it to melt and return to its proper reference condition. This will maintain the liquid in a partly frozen condition to keep the temperature of the medium constant.

Further objects and advantages of the present invention will be apparent from the following description, reference being had to the accompanying drawings wherein a preferred embodiment of the present invention is clearly shown.

Figure 1:
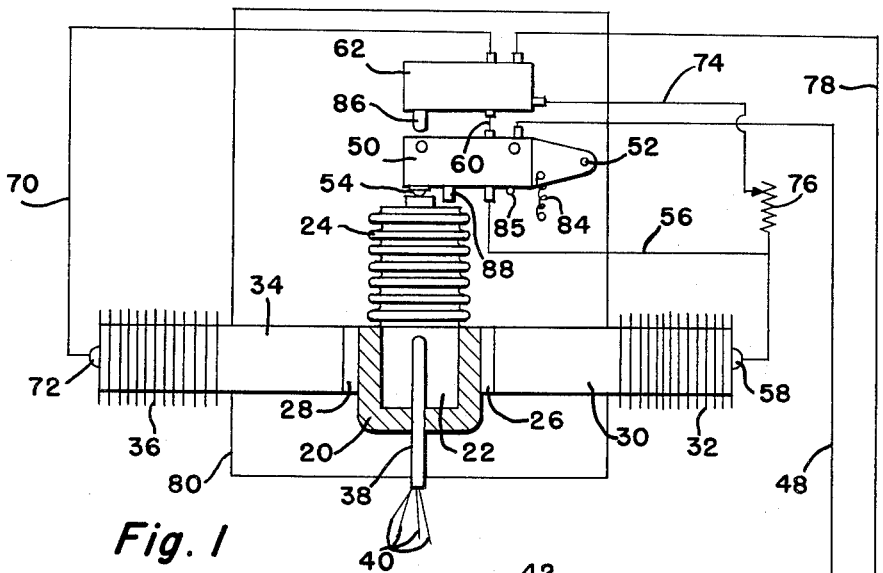
FIGURE 1 is a plan view partly in section and partly diagrammatic of a system embodying one form of my invention.

Referring now to the drawings and more particularly to FIGURE 1, there is mounted upon a base 80 a heavy-walled copper container 20 containing a cavity 22. Extending from this container 20 is a metal bellows 24. The cavity 22 and the bellows 24 have a combined volume of about 3 cc. Upon one side of the copper container 20 is an N-type thermoelectric material 26 which may be, for example, bismuth. Upon the opposite side is a thermoelectric material 28 of the P-type which may, for example, be antimony. However, other thermoelectric materials may be substituted. These thermoelectric materials 26 and 28 are bonded to the walls of the copper container 20. A copper member 30 provided with fins 32 is bonded to the thermoelectric material 26 while a copper member 34 provided with fins 36 is bonded to the thermoelectric material 28. The container 20 is provided with a tube 38 extending into the cavity 22 into which the reference leads 40 of thermocouples are introduced.

Figure 3:
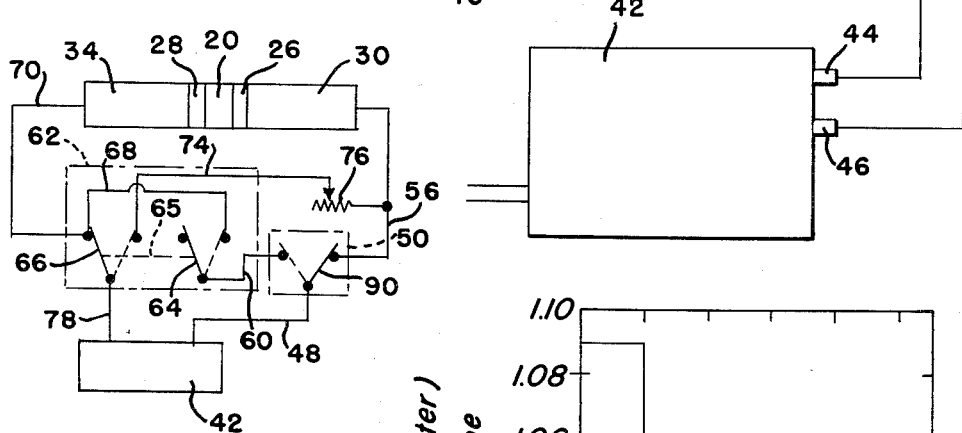
FIGURE 3 is a wiring diagram.

A direct current power source 42 is provided having a positive terminal 44 and a negative terminal 46. The positive terminal is connected by the conductor 48 to one terminal of a single pole, double throw switch 50 which is pivoted upon the pivot pin 52 to the base 80. This switch 50 has an actuating plunger 54 resting upon the top of the bellows 24. This switch 50 is of a sensitive type requiring only a small movement of the plunger 54. The plunger 54 moves with very small force to move the switch 50 from the full line position to the dotted line position as illustrated in FIGURE 3. It has one terminal connected by the conductor 56 to the terminal 58 upon the copper member 30 of the thermoelectric cell.

The switch 50 has a third terminal connected by the flexible conductor 60 to the movable switch blade 64 of a double pole, double throw reversing switch 62. The switch 62 has a second movable switch blade 66 which is linked by a link 65 to the switch blade 64 so that they operate in unison. The outermost or the two opposite extreme stationary contacts associated with the blades 64 and 66 are electrically connected together within the housing of the switch 62 by a conductor 68. The conductor 68 also connects to a conductor 70 connecting to the terminal 72 upon the member 34 bonded to the P-type material 28. The switch blade 66 also cooperates with a stationary contact connecting to the conductor 74 which connects through a variable resistance 76 to the conductor 56. The switch blade 66 is connected by the conductor 78 to the negative terminal of the power supply 42. The apparatus is mounted upon a suitable base 80.

The cell 20 and the bellows 24 are filled completely with a suitable reference liquid which expands upon freezing or congealing. Water is a very suitable liquid for this purpose since, as it freezes as shown in FIGURE 3, it expands about nine percent at 0° C. Other liquids which may be used instead of water if desired are glycerol, freezing at 17.9° C.; benzene, freezing at 5.51° C.; oleic acid, freezing at 14.0° C.; and acetic acid, freezing at 16.6° C.

The switch 50 is pivoted to the base 80 by the pivot pin 52 and is yieldingly urged toward contact with the bellows 24 by a light-tension type coil spring 84 against a stop pin 85 upon the base 80. Upon partial freezing of the liquid in the cavity 22, the bellows 24 will expand to operate the plunger 54 to move the switch blade 90 from the full line to the dotted line position to stop the flow of current through he thermoelectric elements. The switch 62 is fixed to the base 80 and is operated by a plunger 86 which is engaged by the top of the housing of the switch 50 upon an additional freezing and additional expansion of the bellows 24 after the plunger 54 of the switch 50 has been depressed to operate the switch blade 90 from the full line position to the dotted line position as shown in FIGURE 3 and a pin 88 upon the housing of the switch 50 is engaged.

If the apparatus is started at room temperature, the direct current power supply 42 is activated to start the flow of current through the thermoelectric cell system from the terminal 58 through the conductor 30, the N-type material 26, the cell 20, the P-type material 28, the copper member 34 to the terminal 72. This will cause the thermoelectric material 26 and 28 and the cell 20 to be cooled, thereby cooling the water within the cavity 22 until it begins to freeze. As soon as the water in the cavity 22 has frozen a predetermined amount, the plunger 54 will be actuated to operate the switch blade 90 of the switch 50 from the full line position to the dotted line position shown in FIGURE 3. This will disconnect the terminal 44 from the terminal 58 to stop the flow of current through the apparatus, allowing the ice in the water 22 to melt until the plunger 54 is released sufficiently to allow it to move back to its original position in which the switch blade is moved to the full line position to restore the cooling circuit. The apparatus will normally cycle in this manner to maintain the water within the cavity 22 at 0° C. with exceptional accuracy. An accuracy as high as 1/100 of a degree can be obtained by this apparatus.

Should the apparatus be operated in an environment below 0° C., the disconnection of the power source 42 will not stop the freezing of the water within the cavity 22. The continued freezing of the water in the cavity 22 will then cause additional expansion of the bellows 24. This will cause the engagement of the stop pin 88 and the upward movement of the switch 50 until the plunger 86 of switch 62 is engaged to move the double throw, double pole reversing switch 62 from its full line position to its dotted line position as shown in FIGURE 3. This will reverse the flow of current between the terminals 58 and 72 so that the thermoelectric material will heat container 20 to cause the melting of the water in the cavity 22. The current flows from the terminal 44 through the conductor 48, the switch blade 90, the conductor 60, the switch blade 64, the conductors 68 and 70, the terminal 72, the copper member 34, the P-type thermoelectric material 28, the copper cell 20, the N-type thermoelectric material 26, the copper member 30, the terminal 58, part of the conductor 56 to the variable resistance 76, through the conductor 74, the switch blade 66, the conductor 78 to the terminal 46. The variable resistance 76 may be used to reduce the current flow for heating.

The contraction of the bellows 24 upon the warming of the water in the cavity 22 will first cause the plunger 86 to be released by the downward movement of the switch 50 to return the switch 62 to its full line position shown in FIGURE 3 which will disconnect the terminal 44 from the terminal 58 to stop the heating current supply to the thermoelectric system. Should the environment be below 0° C., further freezing of the water in the cavity 22 will again take place. The system will then cycle between thermoelectric heating and the idle condition as long as the environment temperature remains below 0° C. The variable resistance 76 through which the current flows during the heating period may be adjusted to reduce the heating rate if desired.

Figure 2:
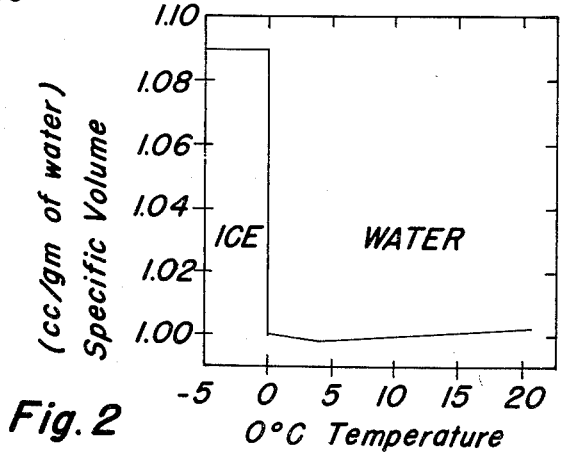
FIGURE 2 is a graph showing the expansion of water when it freezes.

The slight pressure required to operate the switches 50 and 62 has an effect of less than 1/100 of a degree centigrade upon the temperature of the water in the cavity 22. As shown in FIGURE 2, during the formation of ice in the water, the temperature remains at 0° C. over an expansion of about nine percent. Therefore, considerable latitude in the amount of ice being formed is possible and makes very accurate temperature conditions available. The device therefore can maintain the temperature accurately over relatively wide variations in the amount of ice forming in the cell.

If the reference temperature device is always to be used at a temperature above the freezing temperature of the liquid in the cavity 22, the double pole, double throw reversing switch 62 may be omitted, if desired, so that the cooling will be cycled under the control of the switch 50.

While the embodiment of the present invention as herein disclosed, constitutes a preferred form, it is to be understood that other forms might be adopted.

What is claimed is as follows:
1. A temperature control device including a container containing a liquid to be maintained substantially at its freezing temperature, means for cooling said liquid below its freezing point, said liquid having the property of expanding upon congelation, means responsive to the expansion upon congelation, of said liquid for deactivating said cooling means, and means responsive to further expansion of said liquid for heating said liquid.

2. A temperature control device including a container containing a liquid to be maintained substantially at its freezing temperature, said liquid having the property of expanding upon congelation, a thermoelectric apparatus in heat transfer relation with said liquid, a power supply connected to said thermoelectric apparatus to activate said apparatus to cool said liquid, means responsive to the expension upon congelation of said liquid for electrically disconnecting said power supply from said thermoelectric apparatus, and means responsive to a further expansion of said liquid for reversing the electrical connections between said power supply and said thermoelectric apparatus to activate said apparatus to heat said liquid.

3. A temperature control device including an expansible container containing and being substantially filled with a liquid to be maintained substantially at its freezing temperature, said liquid having the property of expanding upon congelation to expand the container, said container being provided with means for holding a temperature responsive element in heat transfer with said liquid, an N-type thermoelectric material outside of and bonded to one external surface of said container, a P-type thermoelectric material outside of and bonded to another external surface of said container, said container having electrical conducting material extending between said surfaces, a direct current power source having a positive terminal electrically connected to said N-type material and a negative terminal connected to the P-type material, said container being provided with a resilient wall, and a switch connected in series with one of the electrical connections of said power source and operatively associated with said resilient wall for stopping the current flow through the N-type and P-type material upon the deflection of said resilient wall as a result of the congealing of said liquid.

4. A temperature control device including an expansible container containing and being substantially filled with a liquid to be maintained substantially at its freezing temperature, said liquid having the property of expanding upon congelation to expand the container, said container being provided with means for holding a temperature responsive element in heat transfer with said liquid, an N-type thermoelectric material bonded to one surface of said container, a P-type thermoelectric material bonded to another surface of said container, said container having electrical conducting material extending between said surfaces, a direct current power source having a positive terminal electrically connected to said N-type material and a negative terminal connected to the P-type material, said container being provided with a resilient wall, and a reversing switch connected in series between said power source and said N-type and P-type materials and operatively associated with said resilient wall for reversing the current flow through the N-type and P-type material upon deflection of said resilient wall as a result of the congealing of said liquid.

5. A temperature control device including a container containing a liquid to be maintained substantially at its freezing temperature, said liquid having the property of expanding upon congelation, an N-type thermoelectric material bonded to one surface of said container, a P-type thermoelectric material bonded to another surface of said container, said container having electrical conducting material extending between said surfaces, a direct current power source having a positive terminal electrically connected to said N-type material and a negative terminal connected to the P-type material, said container being provided with a resilient wall, a switch connected in series with one of the electrical connections of said power source and operatively associated with said resilient wall for stopping the current flow through the N-type and P-type material upon the deflection of said resilient wall as a result of the congealing of said liquid, and a reversing switch connected in series between said power source and said N-type and P-type materials and operatively associated with said resilient wall upon greater deflection thereof than required for the operation of said first mentioned switch for reversing the current flow through the N-type and P-type material upon further expansion of said liquid.

References Cited in the file of this patent

UNITED STATES PATENTS

| | | |
|---|---|---|
| 2,187,258 | Wood | Jan. 16, 1940 |
| 2,524,886 | Colander | Oct. 10, 1950 |
| 2,672,017 | Muffly | Mar. 16, 1954 |
| 2,766,937 | Snavely | Oct. 16, 1956 |
| 2,922,284 | Danielson | Jan. 26, 1960 |
| 2,952,724 | Fritts | Sept. 13, 1960 |
| 2,954,679 | Blackett | Oct. 4, 1960 |
| 2,986,890 | Bevans | June 6, 1961 |